United States Patent [19]

Schlamersdorf

[11] 3,886,895

[45] June 3, 1975

[54] APPARATUS FOR TREATING PARTICULATE MATTER WHILE IN A FLUIDIZED STATE

[75] Inventor: John Michael Schlamersdorf, Edwardsburg, Mich.

[73] Assignee: Miles Laboratories, Inc., Elkhart, Ind.

[22] Filed: Nov. 16, 1972

[21] Appl. No.: 307,200

[52] U.S. Cl. ...................... 118/7; 118/48; 118/303; 118/DIG. 5
[51] Int. Cl. ............................................. C23c 13/08
[58] Field of Search .............. 118/7, 4, 8, 429, 303, 118/24, 19, DIG. 5; 117/DIG. 6, 100 R, 100 A, 100 B, 100 C, 100 D, 100 M, 100 S

[56] References Cited
UNITED STATES PATENTS

| | | | |
|---|---|---|---|
| 2,123,537 | 7/1938 | Marr | 118/DIG. 7 |
| 2,644,769 | 7/1953 | Robinson | 118/DIG. 5 |
| 2,924,489 | 2/1960 | Beckman | 117/DIG. 6 |
| 3,019,126 | 1/1912 | Bartholomew | 117/DIG. 6 |

Primary Examiner—Morris Kaplan

[57] ABSTRACT

An apparatus for treating particulate matter while in a fluidized state in a plurality of fluidized bed chambers. The apparatus has means for causing gas flow therethrough having an inlet and an outlet, and a plurality of treating units. Each treating unit includes a fluidized bed chamber having means for gas flow therethrough and into the inlet, a bypass for gas flow external to the fluidized chamber and into the inlet, and means for cooperatively regulating the flow of gas through the chamber and through the bypass into the inlet so that a substantially constant flow of gas is maintained thereinto from the treating unit. In this way the flow of gas through each unit is unaffected by operating conditions of other units of the apparatus. Further, the outlet from the gas flow means may be conveniently connected to suitable treating equipment for recovery of solvents and of solid particles included in effluents from the apparatus and for the performance of other operations thereon to render such effluents ecologically acceptable.

3 Claims, 1 Drawing Figure

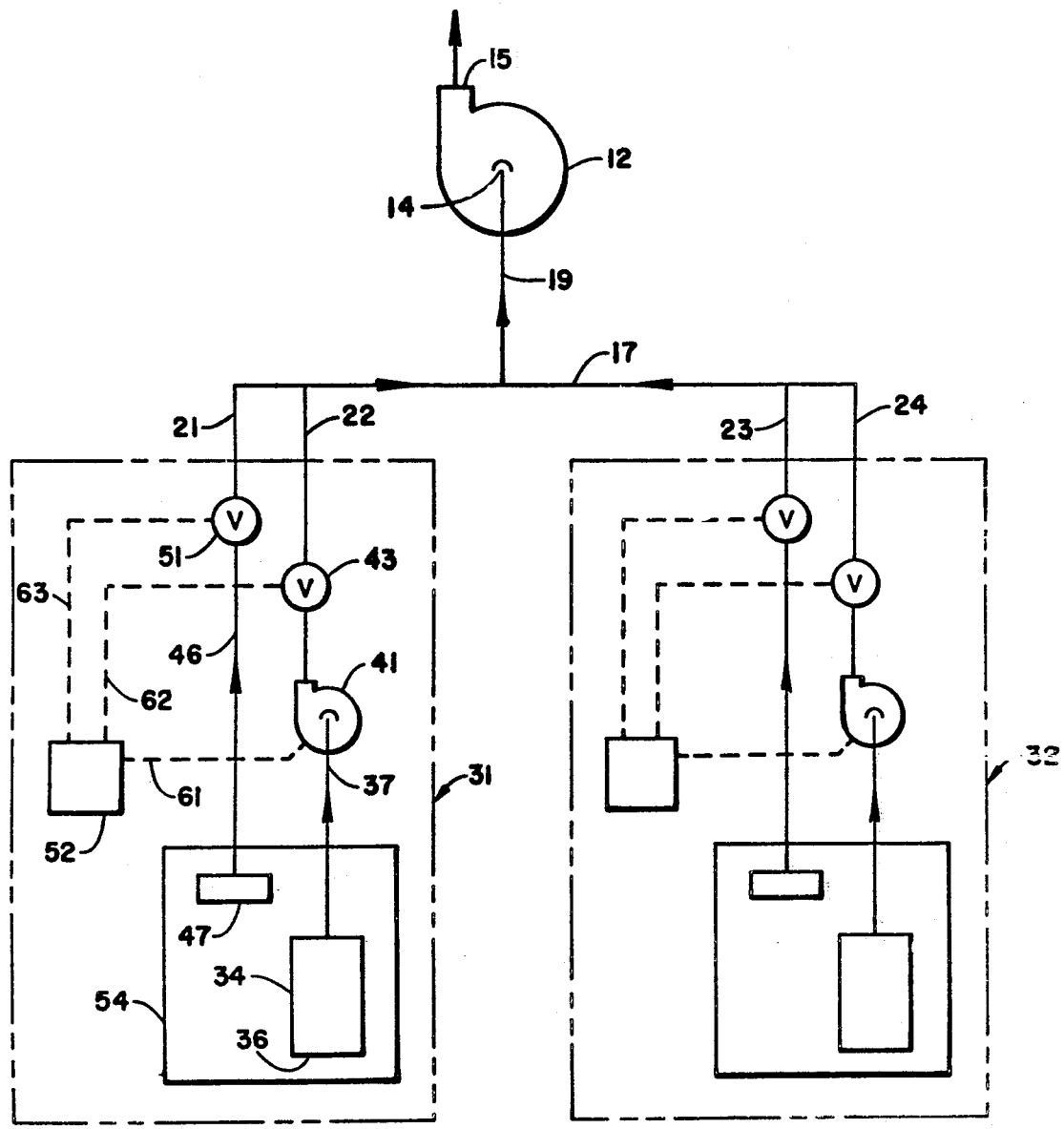

APPARATUS FOR TREATING PARTICULATE MATTER WHILE IN A FLUIDIZED STATE

BACKGROUND OF THE INVENTION

The present invention relates to an apparatus for treating particulate matter while in a fluidized state. More particularly, this invention relates to an apparatus including a plurality of fluidized bed chambers capable of functioning singly, simultaneously or in intermediate combinations thereof while the condition of any one chamber within the apparatus is substantially unaffected by the condition of other chambers of the apparatus.

It is known that fluid characteristics can be imparted to a quantity of particulate matter by a suitable flow of a supporting fluid therethrough. Particulate matter in such a fluidized state, often referred to as a fluidized bed, has been used in diverse operations, such as the examples described in the book "Fluidization", by Leva, M. published by McGraw-Hill Book Company, Inc.

It is further known that the drying or coating of particulate matter is enhanced in many situations if the same is placed in a fluidized state prior to the treating thereof. Apparatus for treating material in such a manner are described in U.S. Pat. Nos. 3,241,520, 3,253,944 and 3,437,073.

The term "fluidized bed" as used herein refers to a true fluidized bed in which all particulate matter is suspended in a supporting fluid in a static state and pseudo fluidized beds in which a directional flow, which may be vertical, horizontal or a combination thereof is imparted to the particulate matter.

The term "fluidized bed chamber" as used herein refers to a means suitable for containing a fluidized bed as defined above or particulate matter in a fluidized state.

Once a fluidized state is obtained with particulate matter in a fluidized bed chamber, a slight variation or surge in the flow of the supporting fluid can result in serious disruption of the fluidized state. A sudden increase in the flow of supporting fluid can produce undesired turbulence, causing the particulate matter to break into smaller pieces, or may even expel the particulate matter from the chamber by entrainment in the fluid. A sudden drop in the flow of supporting fluid can cause unwanted agglomeration of the particles or permit the particles to stick to the walls of the fluidized bed chamber. Of course, other adverse affects have been related to the occurrence of surges in the flow of the supporting fluid above or below the flow required to maintain the desired fluidized state.

Because of sensitivity to such surges, fluidized beds are usually operated as independent units. Although continuous flow fluidized bed equipment has been designed, such equipment is unsuited for many uses because it lacks adequate control of the flow of the supporting fluid therethrough.

Accordingly, it is an object of this invention to provide an apparatus combining the degree of control normally obtained with independent fluidized beds with the economy of a continuous type operation.

It is a further object of this invention to provide an apparatus which may readily be combined with an economical and efficient solvent recovery system for treatment of processing effluents therefrom.

It is another object of this invention to provide an apparatus which may be conveniently combined with a system suitable for rendering processing effluents ecologically acceptable.

SUMMARY OF THE INVENTION

This invention is embodied in an apparatus for treating particulate matter in a fluidized state in a plurality of treating units each of which is substantially free of surge of supporting fluid regardless of operating conditions of other treating units. The apparatus comprises means for causing a flow of gas through the apparatus having an inlet and an outlet, and a plurality of treating units. Each treating unit includes a fluidized bed chamber having means for gas flow therethrough and into the inlet, means for bypass gas flow external to the chamber and into the inlet and means for regulating flow of gas through the chamber gas flow means and the bypass gas flow means so that a substantially constant flow of gas is maintained to the inlet. With this novel apparatus each of the plurality of treating units is maintained at nearly ideal conditions at all times.

DESCRIPTION OF THE PREFERRED EMBODIMENTS

Referring now to the accompanying schematic block diagram, an apparatus in accordance with the subject invention is illustrated. The apparatus includes means for causing a flow of gas through the apparatus consisting of a fan or blower 12 having an inlet 14 and an outlet 15, a manifold 17 having an exhaust 19 connected to the inlet 14 of blower 12 and a plurality of intakes 21, 22, 23 and 24. Manifold 17 is a tube of sufficient cross section to permit the free flow of gas therethrough to blower 12.

In the block diagram, two treating units 31 and 32 are illustrated. Although only two units are illustrated, it is understood that this apparatus may include a plurality of units. Since these treating units are substantially identical, only treating unit 31 will be described herein.

Within treating unit 31 is a suitable fluidized bed chamber 34 having gas inlet means 36 consisting of a plurality of openings in the bottom thereof and an outlet 37 extending through the top thereof connected to intake 22 of the manifold. Outlet 37 includes a booster blower 41 and a gas flow control valve 43 capable of regulating flow of gas therethrough. Treating unit 31 further includes a bypass duct 46, suitable for gas flow, connected to intake 21 of the manifold and having an inlet 47 external to chamber 34 and a gas flow control valve 51 therein capable of controlling the flow of gas therethrough. A regulator 52 starts and stops booster blower 41 and opens and closes control valves 43 and 51 by suitable means in conjunction with the operation of chamber 34. Regulator 52 is communicatively joined to blower 41 and control valves 43 and 51 by transmitting means 61, 62 and 63 respectively, shown as dashed lines in this illustration. In this embodiment intake 36 and intake 47 are enclosed in a room 54 which is supplied preconditioned air from a suitable air conditioning source (not shown).

The operation of the apparatus of this invention will be discussed in the following as it is used in applying a film coating to pharmaceutical tablets. Although this discussion refers to a single unit, it is understood that it applies equally well to the other units of the apparatus. It is also understood that this discussion does not limit the scope of this invention in any way.

In applying this coating, a flow of gas is first established through the apparatus by starting blower 12 which is electrically driven. This blower has a capacity that is large enough to maintain a desired flow of gas through the apparatus. Advantageously the flow of gas is limited to the bypass duct 46 in each unit, at least until the desired flow is established. To achieve this flow of gas, control valve 51 on bypass duct 46 is opened, control valve 43 on outlet 37 is closed and blower 41 is stopped.

With control valve 43 closed, there is no flow of gas through chamber 34. Accordingly, it is possible to load chamber 34 with tablets to be coated without upsetting the flow of gas through the apparatus. Having prepared chamber 34 for coating tablets, the flow of gas is transferred thereto by opening valve 43 and starting blower 41 as valve 51 is closed. In this embodiment, blower 41 is provided as a means of compensating for a pressure drop which occurrs across the chamber as a result of the flow of gas through the tablets therein.

With the cooperative closing of valve 51, and the opening of valve 43 and starting of blower 41, the established flow of gas out of treating unit 31 and into manifold 17 is substantially unchanged. Accordingly, the flow of gas through other units of the apparatus is unaffected by this transfer of flow of gas within unit 31 from bypass duct 46 to chamber 34.

The opening and closing of valves 43 and 51, and the starting and stopping of booster blower 41 are controlled by the regulator 52 which is a timed electrical control. This regulator may be preset to transfer the flow of gas upon completion of the tablet-coating and at other times when such transfer is desired.

The flow of gas through chamber 34 established a fluidized state in the tablets therein. A coating material in suitable solvents is introduced, by suitable spray means (not shown), along with the flow of gas into the chamber through inlet means 36. As the coating material travels upward through the tablets in chamber 34 along with the flow of gas, a major portion deposits on the tablets forming the desired coating. Excess coating material and the solvents are carried through the apparatus by the flow of air and are expelled therefrom through outlet 15.

Rather than expel noxious materials into the atmosphere, outlet 15 may readily connect to recovery and neutralization equipment appropriate for treating such materials. Such a recovery operation is facilited by the combining of the effluents from the plurality of treating units into a common stream having a steady flow of gas. With this steady flow, the operating conditions of the recovery equipment can be optimized rather than being designed to accommodate wide fluctuations in flow of gas.

Upon obtaining the desired coating on the tablets the flow of gas is transferred to bypass duct 46 by opening control valve 51 as control valve 43 is closed and blower 41 is stopped. Again no fluctuation occurs in the established flow of gas out of unit 31 into manifold 17 and no surge is experienced in other units of the apparatus because of this change in operating conditions. With the flow of gas occurring through bypass duct, the coated tablets are easily removed from the chamber, the chamber charged with uncoated tablets and the coating cycle begun again.

With this apparatus coating may be begun in any number of the units at one time or, in a similar manner, stopped at a given time. However, economy is realized when this apparatus is operated as psuedo continuous fluidized bed equipment. In such operation the completion of coating of tablets in the units is staggered such that only one unit of the plurality of units is in need of recharging with uncoated tablets at a given time. Upon completion of the recharging and return to coating of the one unit, another unit completes the coating of tablets and requires recharging, etc. In this way the operation of each unit is interrupted for only a minimum amount of time and few personnel are required to operate the apparatus.

What is claimed is:

1. A surge free apparatus for treating particulate matter in a fluidized state in a plurality of treating units each of which operates in a substantially independent manner, the apparatus comprising, means for causing a flow of gas having an inlet consisting essentially of a manifold having a plurality of intakes, and an outlet, and a plurality of treating units, each treating unit consisting essentially of a fluidized bed chamber having means for gas flow therethrough and into one of said intakes said chamber gas flow means including means disposed between the chamber outlet and said one intake for boosting flow of gas through said chamber to provide compensation means for pressure loss occurring when treating particulate matter in said fluidized bed chamber, means for bypass gas flow external to said chamber and into another of said intakes, and means for cooperatively regulating flow of gas through said chamber gas flow means and said bypass gas flow means so as to maintain a substantially constant flow of gas from said treating unit into said manifold, whereby, each of said treating units is substantially free of a surge of flow of gas regardless of operational status of other treating units.

2. An apparatus as set forth in claim 1 wherein said regulating means consists of valve means for controlling flow of gas in said chamber gas flow means, valve means for controlling flow of gas in said bypass gas flow means and means for cooperatively opening and closing said chamber valve means and said bypass valve means.

3. An apparatus according to claim 1 wherein said means for gas flow through said chamber consists of means for intake to said chamber and means for exhaust from said chamber connecting said chamber outlet to said booster means.

* * * * *